US011418570B2

(12) United States Patent
Biswas et al.

(10) Patent No.: US 11,418,570 B2
(45) Date of Patent: Aug. 16, 2022

(54) ROBUST COMPUTING DEVICE IDENTIFICATION FRAMEWORK

(71) Applicant: Adobe Inc., San Jose, CA (US)

(72) Inventors: Sanjeev Kumar Biswas, Bangalore (IN); Mayank Goyal, Noida (IN); Sharad Srivastava, Noida (IN)

(73) Assignee: Adobe Inc., San Jose, CA (US)

( * ) Notice: Subject to any disclaimer, the term of this patent is extended or adjusted under 35 U.S.C. 154(b) by 158 days.

(21) Appl. No.: 16/865,494

(22) Filed: May 4, 2020

(65) Prior Publication Data
US 2020/0267240 A1 Aug. 20, 2020

Related U.S. Application Data

(62) Division of application No. 14/988,954, filed on Jan. 6, 2016, now Pat. No. 10,652,365.

(51) Int. Cl.
H04L 67/01 (2022.01)
H04L 9/40 (2022.01)
G06F 21/41 (2013.01)
G06F 21/57 (2013.01)
G06F 21/30 (2013.01)
(Continued)

(52) U.S. Cl.
CPC .............. H04L 67/01 (2022.05); G06F 21/41 (2013.01); G06F 21/577 (2013.01); H04L 63/0807 (2013.01); H04L 63/0815 (2013.01); H04L 63/0853 (2013.01); H04L 63/0861 (2013.01); G06F 21/305 (2013.01); G06F 21/335 (2013.01); G06F 21/44 (2013.01); G06F 21/45 (2013.01); G06Q 20/20 (2013.01);
(Continued)

(58) Field of Classification Search
CPC . H04L 9/3236; H04L 9/3213; H04L 63/0853; G06F 21/577; G06F 21/41; G06Q 20/382; G06Q 20/3821; G06Q 20/20
See application file for complete search history.

(56) References Cited

U.S. PATENT DOCUMENTS 8,601,109 B2    12/2013  Johannsen
8,875,236 B2 *  10/2014  Holtmanns ............ H04L 63/12
                                                    726/3
(Continued)

FOREIGN PATENT DOCUMENTS

WO    2011154742    12/2011

Primary Examiner — Barbara B Anyan
(74) Attorney, Agent, or Firm — Finch & Maloney PLLC

(57) ABSTRACT

A client device is tracked over a period of time using "refresh tokens" that are exchanged in conjunction with routine client-server communications. Each communication cycle between client and server includes a refresh token that is recorded at the server. The recorded refresh tokens are mapped to both server- and client-generated device identifiers. As communications between client and server occur, a chain of tokens, one for each communication cycle, is progressively recorded at the server. If the server receives a token that is outdated with respect to that which is otherwise expected based on the progression of the recorded chain, this suggests that the received communication was transmitted from a device that is a clone of another client device. A more robust device identification framework is therefore achieved by using a combination of device identifiers and tokens exchanged between client and server.

20 Claims, 11 Drawing Sheets

(51) Int. Cl.
    *G06F 21/45* (2013.01)
    *G06F 21/33* (2013.01)
    *G06F 21/44* (2013.01)
    *G06Q 20/38* (2012.01)
    *H04L 9/32* (2006.01)
    *G06Q 20/20* (2012.01)

(52) U.S. Cl.
    CPC ....... *G06Q 20/382* (2013.01); *G06Q 20/3821* (2013.01); *H04L 9/3213* (2013.01); *H04L 9/3236* (2013.01)

(56) References Cited

U.S. PATENT DOCUMENTS

| | | | |
|---|---|---|---|
| 9,241,269 B1* | 1/2016 | Giridharan | H04W 4/80 |
| 9,510,193 B2 | 11/2016 | Su et al. | |
| 9,626,137 B2* | 4/2017 | Mihara | G06F 3/1222 |
| 9,648,007 B1* | 5/2017 | Sterling | H04L 63/0853 |
| 9,978,062 B2* | 5/2018 | Raj | G06Q 20/3821 |
| 2004/0122931 A1 | 6/2004 | Rowland et al. | |
| 2010/0011391 A1* | 1/2010 | Carpenter | H04N 21/6334 |
| | | | 725/25 |
| 2010/0306547 A1 | 12/2010 | Fallows et al. | |
| 2011/0030047 A1* | 2/2011 | Gao | H04W 12/068 |
| | | | 726/9 |
| 2011/0173684 A1* | 7/2011 | Hurry | G06F 21/34 |
| | | | 726/6 |
| 2011/0283110 A1* | 11/2011 | Dapkus | G06F 21/577 |
| | | | 713/182 |
| 2011/0307387 A1* | 12/2011 | Francia | G06Q 30/00 |
| | | | 705/65 |
| 2012/0259782 A1* | 10/2012 | Hammad | G06Q 20/382 |
| | | | 705/44 |
| 2013/0227660 A1* | 8/2013 | Murakami | H04L 63/08 |
| | | | 726/5 |
| 2013/0283362 A1 | 10/2013 | Kress et al. | |
| 2014/0189797 A1* | 7/2014 | Nori | H04L 63/0807 |
| | | | 726/4 |
| 2014/0298443 A1* | 10/2014 | Amaro | H04L 63/08 |
| | | | 726/9 |
| 2014/0304786 A1 | 10/2014 | Pei et al. | |
| 2014/0324979 A1* | 10/2014 | Gao | H04L 12/1818 |
| | | | 709/204 |
| 2014/0355034 A1* | 12/2014 | Mihara | G06F 3/1238 |
| | | | 358/1.14 |
| 2015/0067328 A1* | 3/2015 | Yin | H04L 9/3236 |
| | | | 713/168 |
| 2015/0113588 A1 | 4/2015 | Wing et al. | |
| 2015/0134967 A1 | 5/2015 | Moore | |
| 2016/0012426 A1 | 1/2016 | Chitilian et al. | |
| 2016/0028841 A1* | 1/2016 | Jang | H04L 67/42 |
| | | | 709/203 |
| 2016/0057139 A1* | 2/2016 | McDonough | H04L 63/08 |
| | | | 726/6 |
| 2016/0094540 A1* | 3/2016 | Camenisch | H04L 63/0815 |
| | | | 713/155 |
| 2016/0239833 A1* | 8/2016 | Venugopalan | G06Q 20/20 |
| 2016/0259936 A1* | 9/2016 | Mukherjee | G06F 21/41 |
| 2018/0006818 A1* | 1/2018 | Ren | H04L 9/3213 |
| 2018/0375849 A1* | 12/2018 | Koskimies | G07C 9/00 |

* cited by examiner

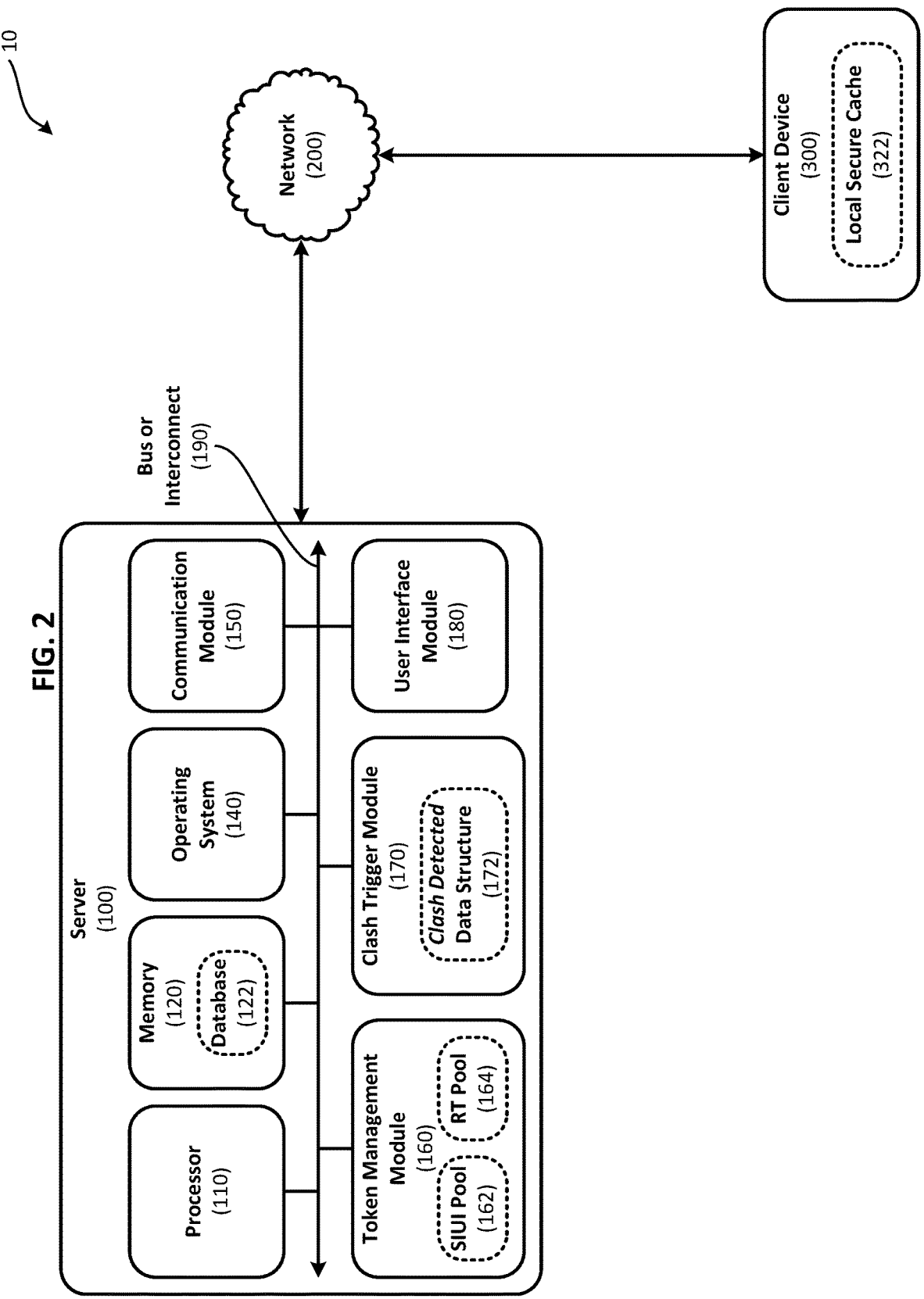

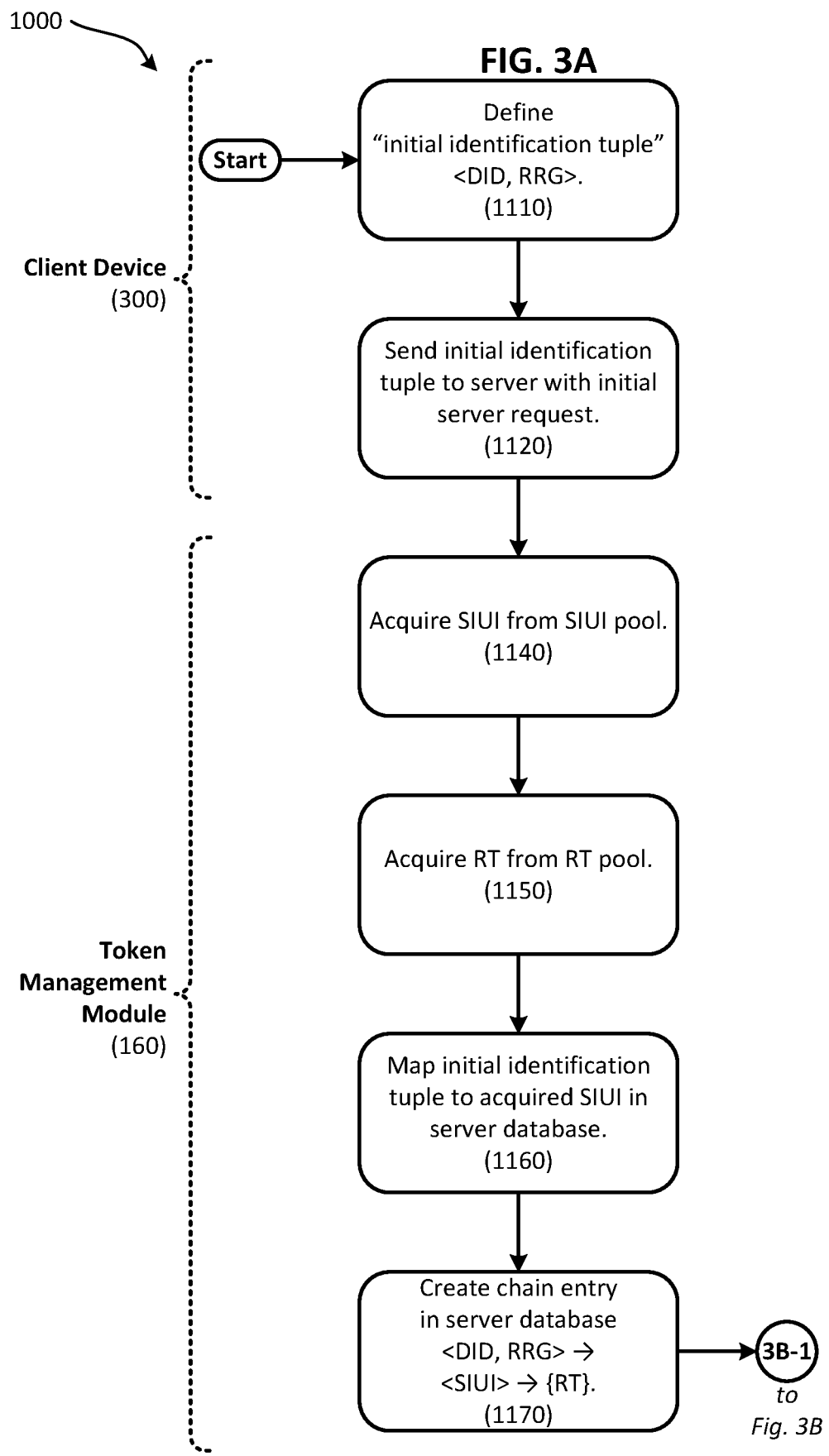

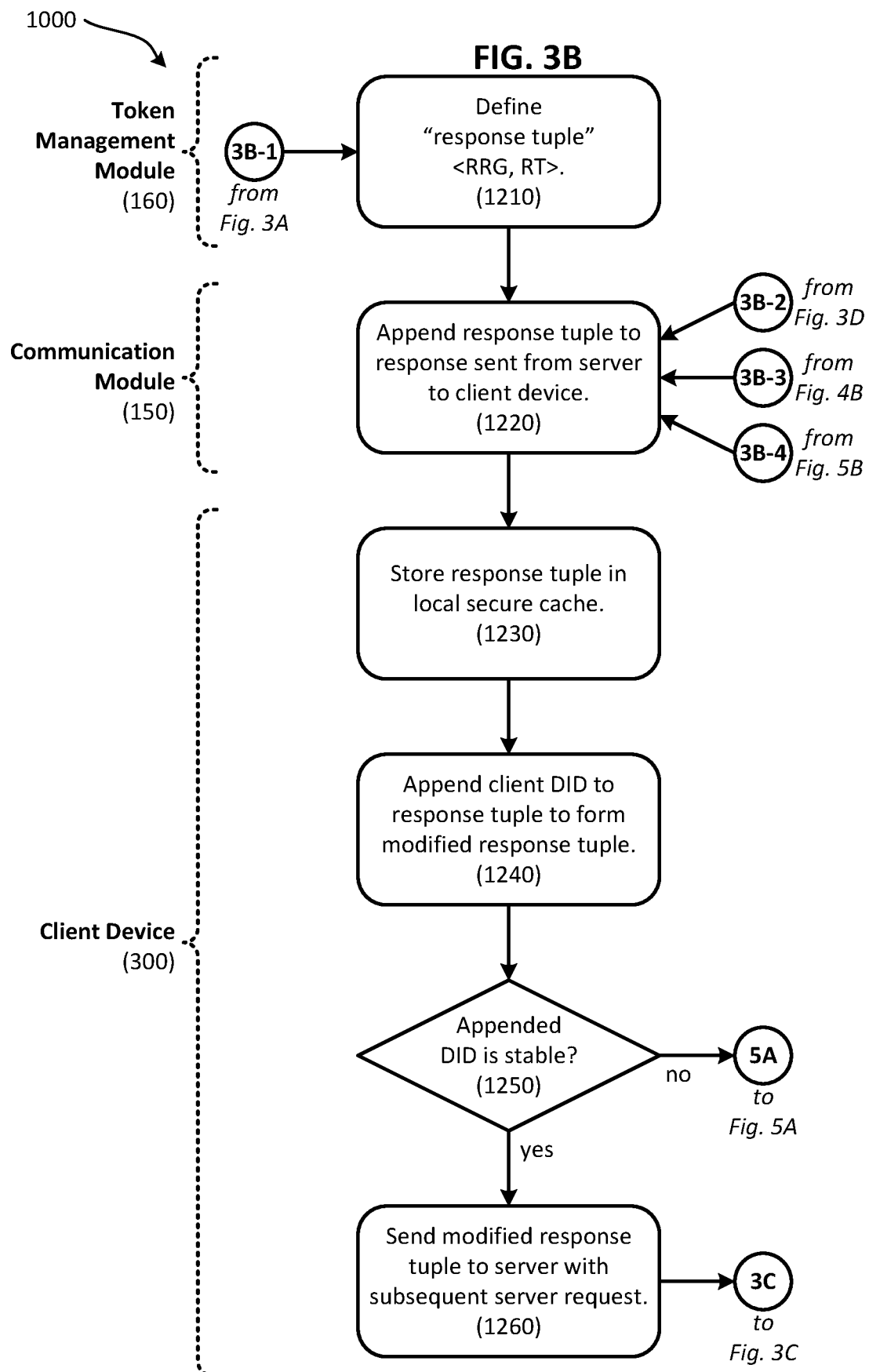

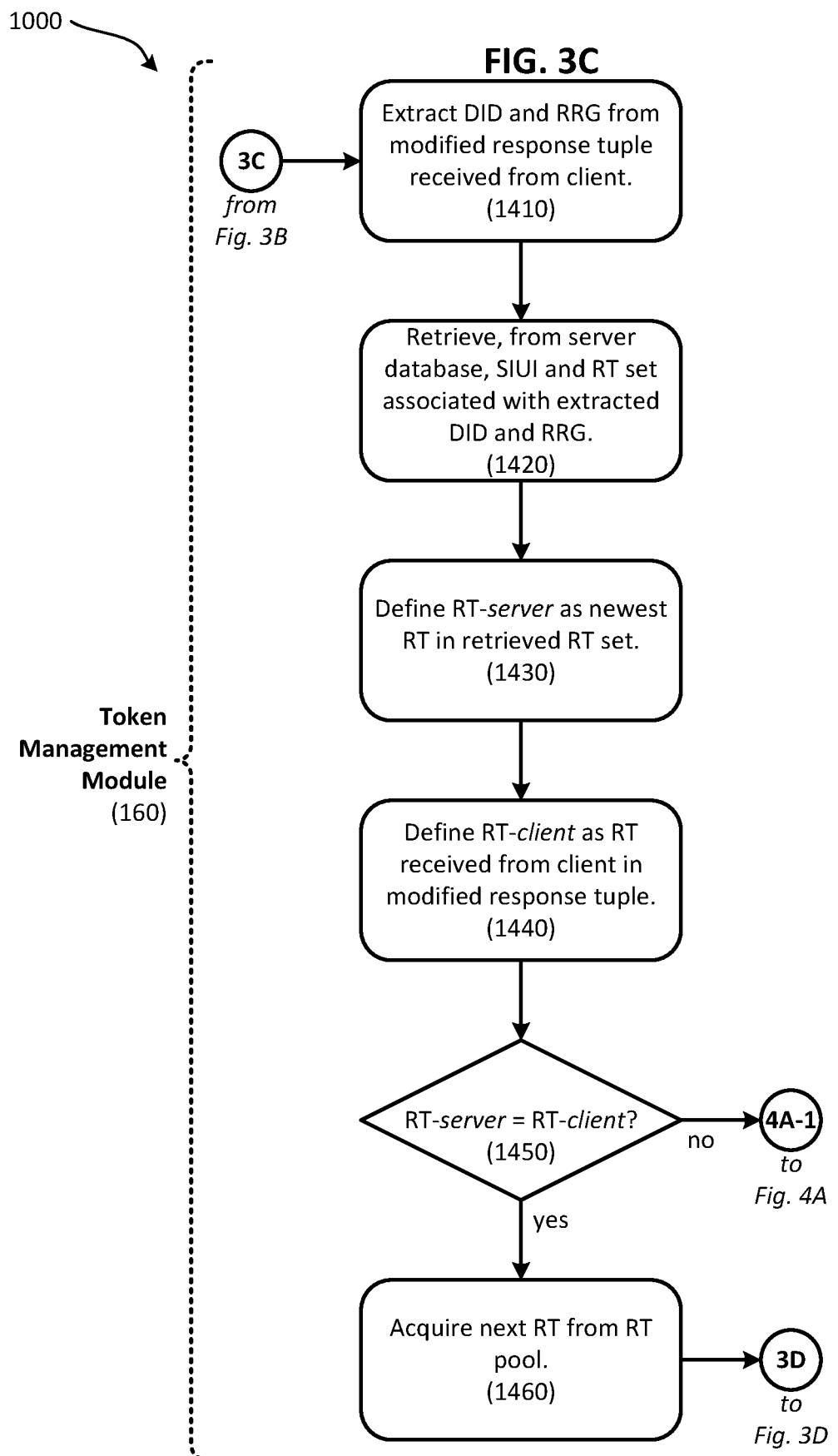

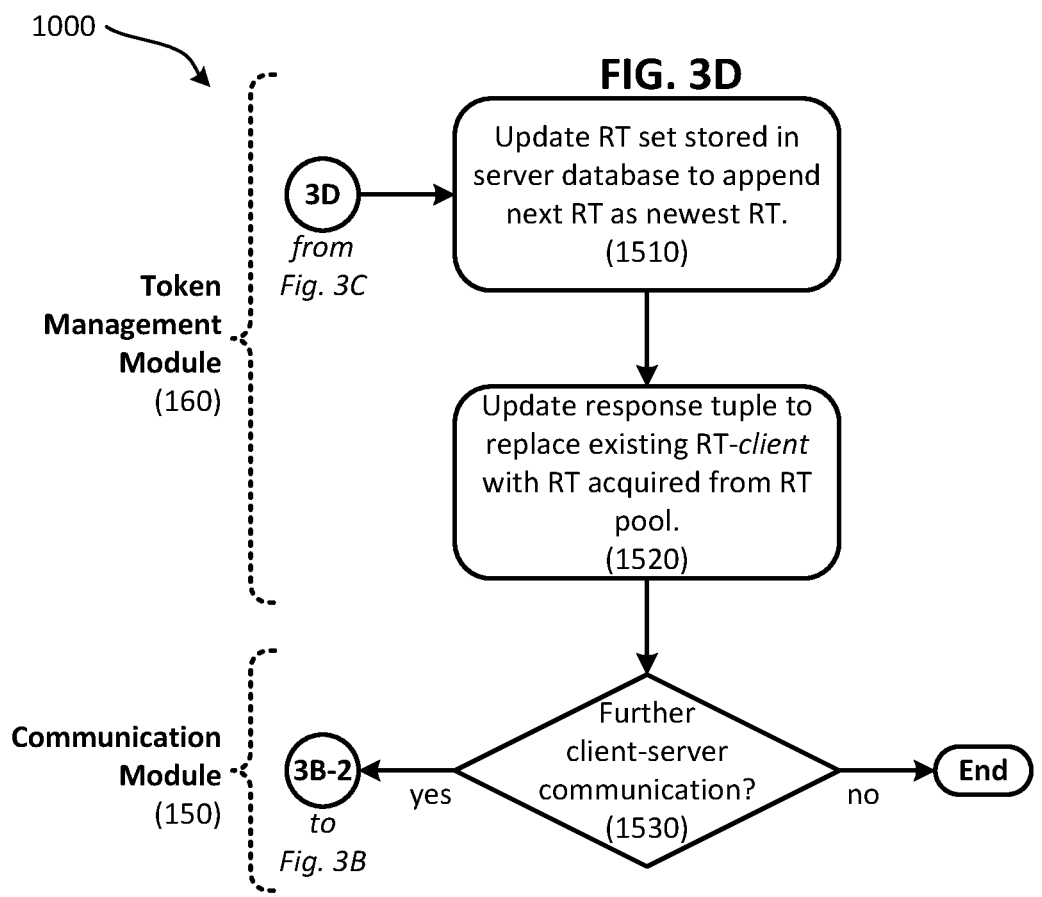

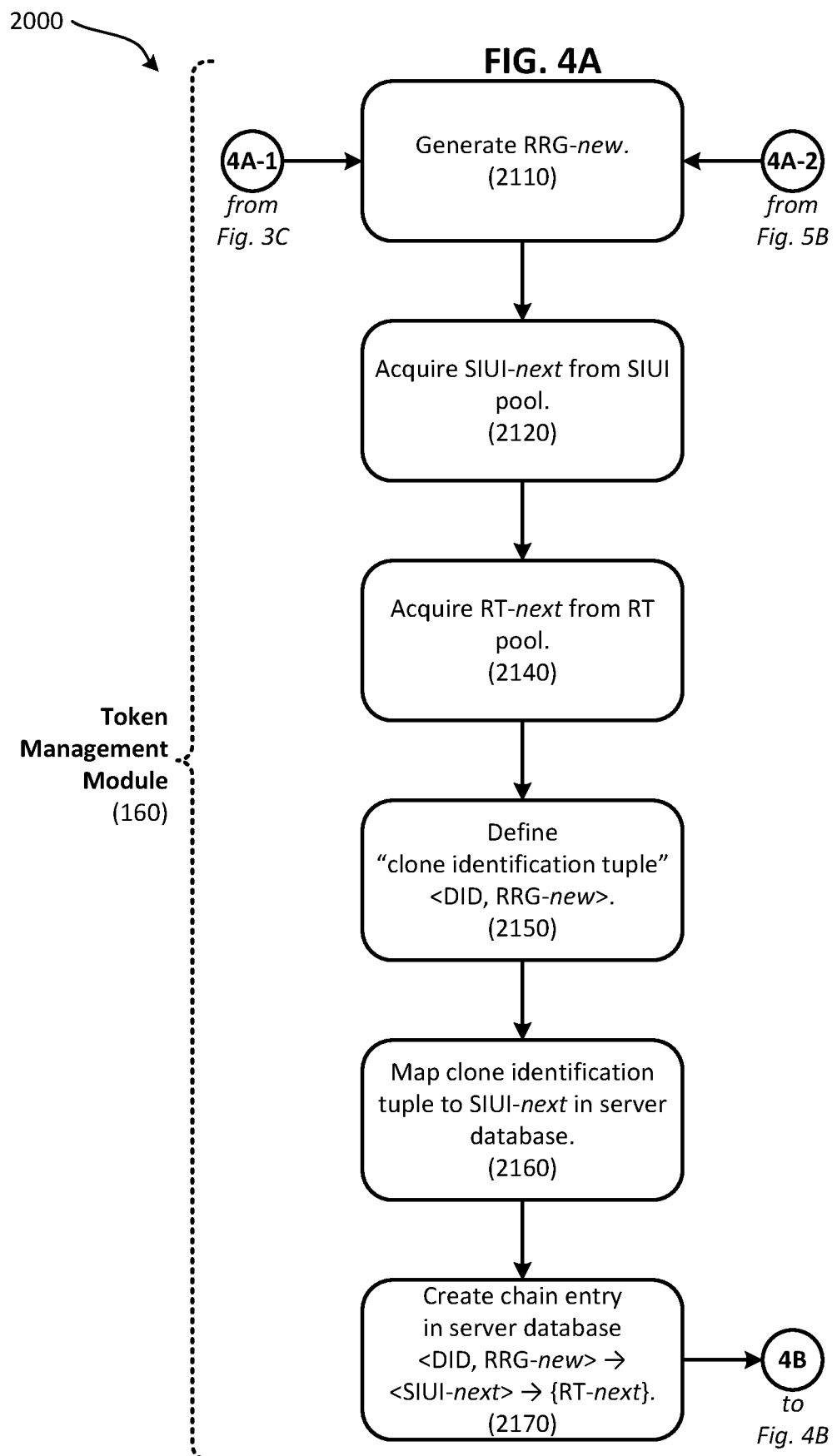

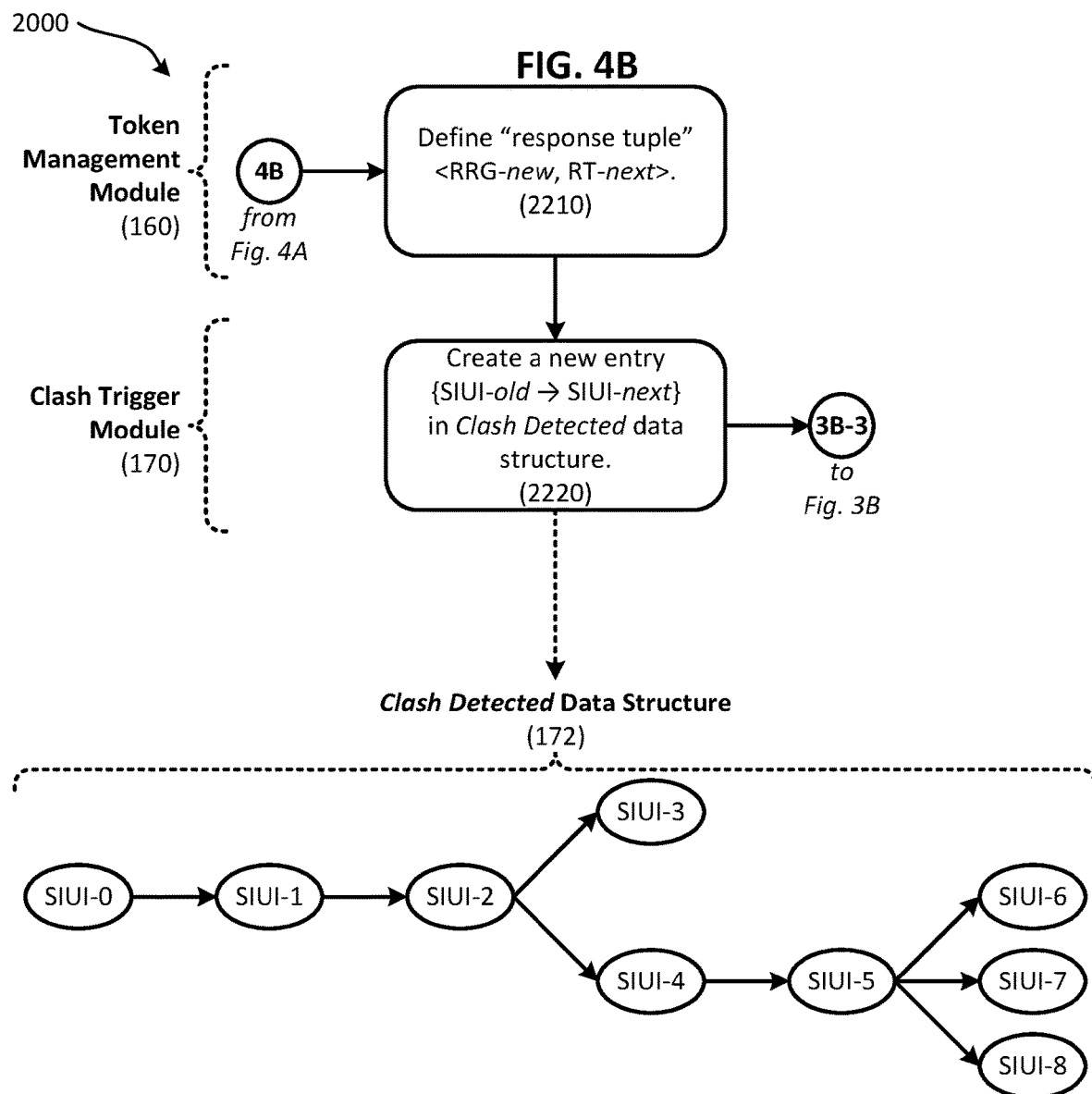

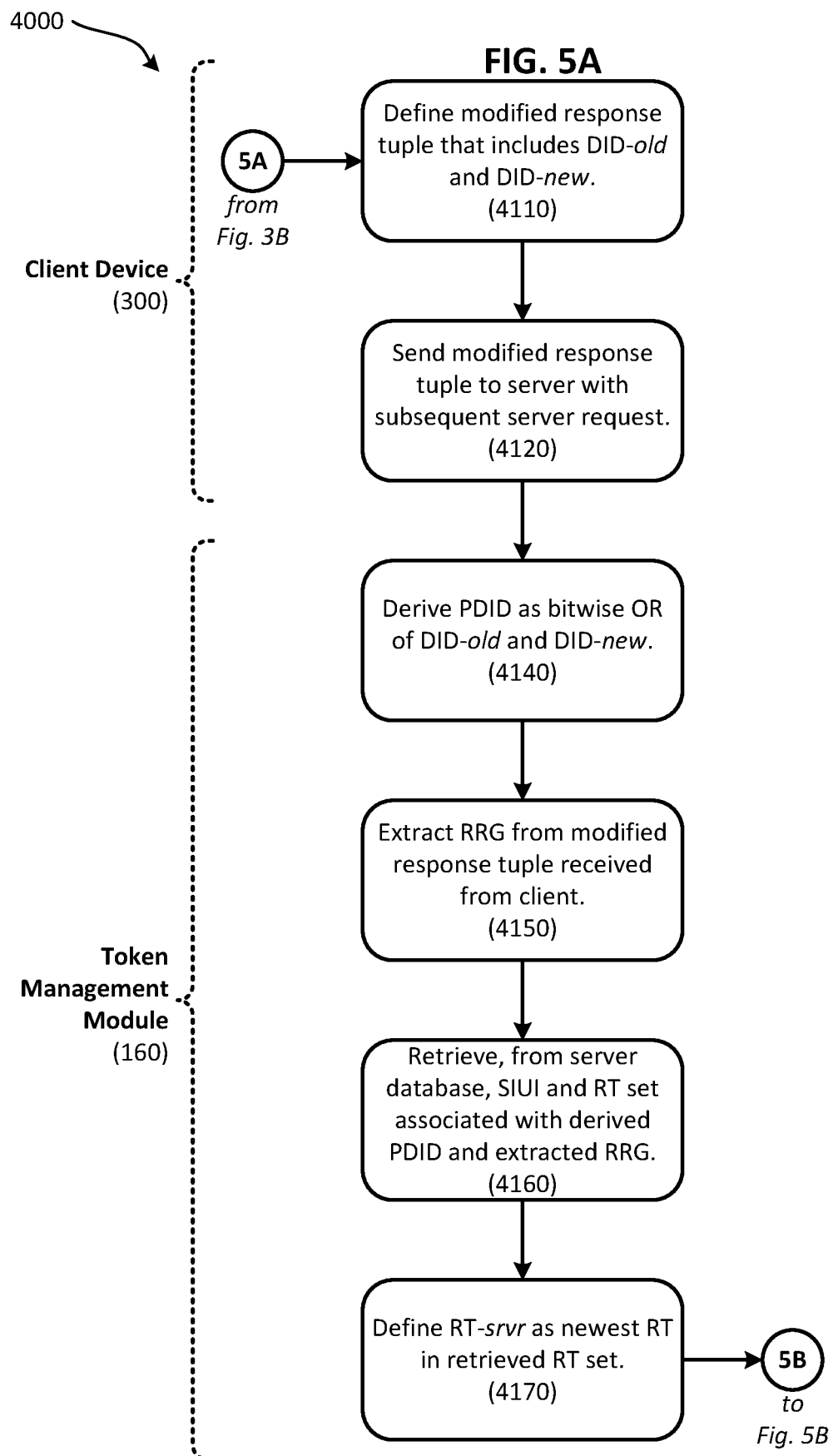

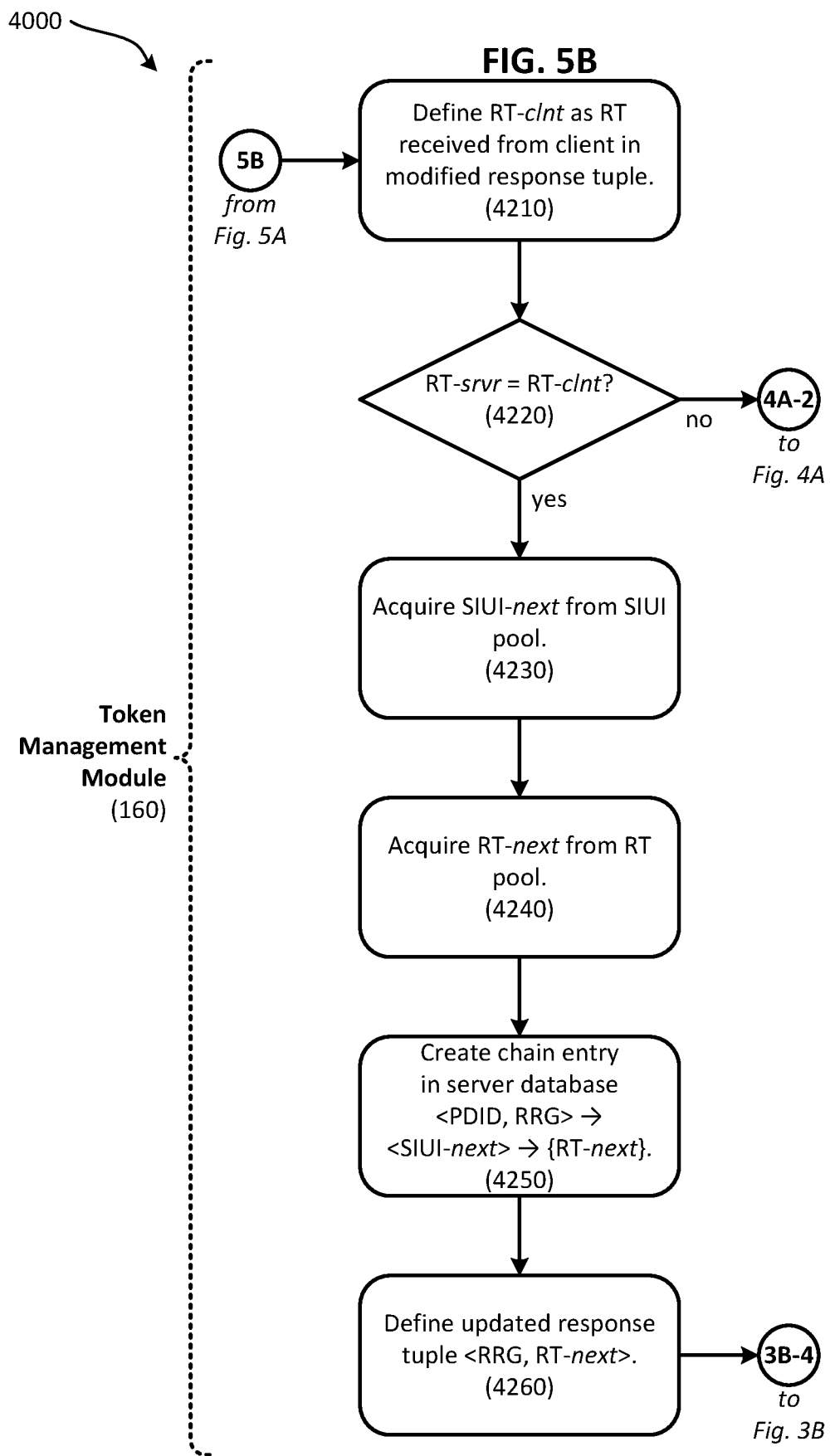

┌─────────────────────────────────────────────────────────────┐
│ Receiving, by a server from a client device, a device        │
│ identifier that has been assigned to the client device.      │
│ (6100)                                                       │
└─────────────────────────────────────────────────────────────┘
                              │
                              ▼
┌─────────────────────────────────────────────────────────────┐
│ Acquiring, by the server, a first refresh token.             │
│ (6200)                                                       │
└─────────────────────────────────────────────────────────────┘
                              │
                              ▼
┌─────────────────────────────────────────────────────────────┐
│ Sending, from the server to the client device, the first     │
│ refresh token.                                               │
│ (6300)                                                       │
└─────────────────────────────────────────────────────────────┘
                              │
                              ▼
┌─────────────────────────────────────────────────────────────┐
│ Receiving, by the server from an unidentified device, the    │
│ device identifier and a second refresh token.                │
│ (6400)                                                       │
└─────────────────────────────────────────────────────────────┘
                              │
                              ▼
┌─────────────────────────────────────────────────────────────┐
│ Making a determination that the first and second refresh     │
│ tokens are identical.                                        │
│ (6500)                                                       │
└─────────────────────────────────────────────────────────────┘
                              │
                              ▼
┌─────────────────────────────────────────────────────────────┐
│ Identifying the unknown device as the client device based on │
│ the determination.                                           │
│ (6600)                                                       │
└─────────────────────────────────────────────────────────────┘
```

ROBUST COMPUTING DEVICE IDENTIFICATION FRAMEWORK

CROSS-REFERENCE TO RELATED APPLICATION

This application is a divisional of U.S. patent application Ser. No. 14/988,954 (filed 6 Jan. 2016), the entire disclosure of which is hereby incorporated by reference herein.

FIELD OF THE DISCLOSURE

This disclosure relates generally to identification of computing devices, and more specifically to a more robust device identification framework that is resistant to challenges presented by cloned devices and duplicate device identifiers.

BACKGROUND

A device identification framework allows a server to uniquely identify a client computing device that requests access to information and resources hosted by the server. Device identification frameworks are used in a wide range of applications including authentication, software licensing, digital content licensing, software update notification, and targeted content distribution. For example, a device identification framework can be implemented in conjunction with a trial program that provides a consumer with free or discounted access to an otherwise restricted resource, such as a software program or multimedia content, for a limited time. Such a trial program relies on a device identification framework to uniquely and reliably identify individual devices. Otherwise, consumers could abuse the trial program by, for example, repeatedly enrolling in a 30-day trial program every month. Device identification frameworks are also used for analytical purposes, for example to track how often recipients of the aforementioned free trial elect to ultimately purchase the software or content that was initially sampled. And as yet another example, a device identification framework can be implemented as part of a two-factor authentication process that combines knowledge-based authentication (such as a password, pattern, or the like) with device-based authentication (such as a recognized computer, smartphone, or the like). Regardless of the particular implementation, existing device identification frameworks generally use a device identifier that, as its name implies, comprises information that identifies a particular client computing device. The device identifier can be based on, for example, a manufacturer-provided identification number, a machine identification code, a telephone number, a mobile identifier, a serial number, a version number, a hardware configuration, or a performance specification. Ideally, the device identifier cannot be manipulated by a consumer, and will uniquely identify a particular client device with respect to all other devices which might interact with a given server.

In theory, a uniquely-assigned device identifier will support a robust device identification framework that allows a server to reliably identify clients that interact with the server. However, as a practical matter, there are several reasons why it is not feasible to rely solely on a client-originated device identifier for device identification. For one thing, in many instances a client cannot be trusted to reliably identify itself with the same device identifier. This may be because the client has an unstable hardware configuration or a defect in the device identifier computation logic. Or it may be because a user has changed, misrepresented, or otherwise manipulated the device identifier with malicious intent. Another reason why relying solely on a client-originated device identifier is inadvisable is because it is impossible to ensure that a given device identifier is truly unique. This is particularly true given that manufacturers are often not scrupulous in assigning identifiers to their devices. Duplicate device identifiers may also arise when a device is virtualized or cloned, for example by a cunning user seeking to exploit a device-based license provided by a software vendor or content provider. This results in the somewhat confusing scenario wherein some devices with duplicate identifiers are acceptable (for example, in the case of the unscrupulous manufacturer), whereas other devices with duplicate identifiers are not (for example, in the case of the cunning user who clones a device). Attempting to resolve this confusion by manipulating how the device identifier is initially assigned will result in significant changes to existing licensing frameworks and installed computing device configurations, and thus is not considered a viable solution from a scalability standpoint. Therefore a more robust device identification framework is sought. Ideally, such a framework would be resistant to challenges presented by cloned devices and duplicate device identifiers, and could be implemented without fundamentally altering existing client architecture or client-server communication systems.

BRIEF DESCRIPTION OF THE DRAWINGS

FIG. 2 is a block diagram schematically illustrating selected components of an example device identification framework that is resistant to challenges presented by cloned devices and duplicate device identifiers.

FIGS. 3A through 3D comprise a flowchart illustrating an example method for identifying a client device to a server device in a client-server computing environment.

FIGS. 4A and 4B comprise a flowchart illustrating an example method for distinguishing cloned devices in a device identification framework.

FIGS. 5A and 5B comprise a flowchart illustrating an example method for identifying a client device to a server device in a client-server computing environment, wherein the client device generates multiple unique device identifier values.

FIG. 6 is a flowchart illustrating a computer-implemented method for identifying client devices in a client-server computing environment.

DETAILED DESCRIPTION

Figure 1:
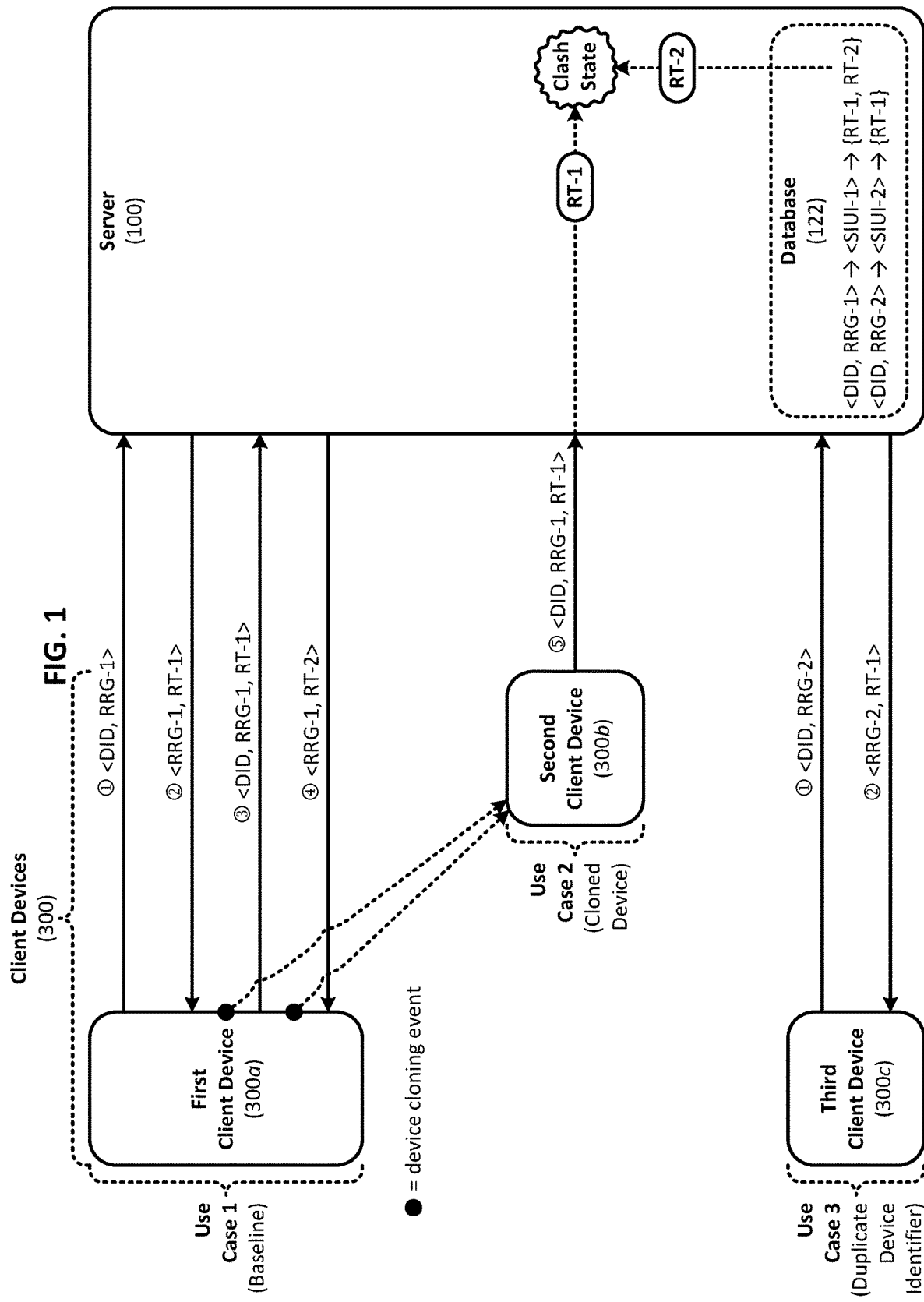
FIG. 1 is a data flow diagram schematically illustrating example communications that occur in a client-server computing environment, and that are made in accordance with an improved device identification framework.

In accordance with certain of the embodiments disclosed herein, a more robust device identification framework is achieved by tracking a client device over a period of time using "refresh tokens" that are exchanged in conjunction with routine client-server communications. In such embodiments, each communication cycle between client and server includes a refresh token that is recorded at the server. The recorded refresh tokens are mapped to both server- and client-generated device identifiers. As communications between client and server occur, a chain of sequential tokens, one for each communication cycle, is progressively recorded at the server. If the server receives a refresh token that is outdated or out-of-sequence with respect to that which is otherwise expected based on the sequence of the recorded chain, this suggests that the received communication was transmitted from a client device that is an unauthorized copy of another client device. For example, if the server has recorded a sequential chain of refresh tokens {α, β, γ} that have been sent to a particular client, then the server will expect that the next communication received from the client will contain the most recently sent refresh token γ. If the next received communication instead contains the outdated refresh token β, this suggests that this communication was received from a client device that is an unauthorized copy of another client device. A more robust device identification framework is therefore achieved by using a combination of device identifiers and tokens exchanged between client and server. This addresses many of the shortcomings associated with existing systems that rely solely on device identifiers. In addition, because such a framework uses refresh tokens that are generated and analyzed at the server, implementation requires little or no modification of existing client-based systems. A wide range of alternative embodiments will be apparent in light of this disclosure.

FIG. 1 is a data flow diagram schematically illustrating example communications that occur in a client-server computing environment, and that are made in accordance with an improved device identification framework. The client-server computing environment comprises a server 100 that is in communication with one or more client devices 300. A first client device 300a transmits to server 100 a first communication ① that includes an identification tuple <DID, RRG-1>. As used herein, the abbreviation "DID" refers to a "device identifier", which is a data string that is intended to uniquely identify a particular client device to a server, although, for reasons summarized above, such identification may not always be reliable. The DID will often be initially assigned by the manufacturer of the client device. As used herein, the abbreviation "RRG" refers to a "root random globally unique identifier", which is a data string that is randomly generated by a client device upon initial operation. In one embodiment, the RRG comprises a 256-byte value that can be represented by a string of alphanumeric characters. Other value lengths can be used in other embodiments. In implementations where several different RRG values are used, the nomenclature RRG-x refers to an xth RRG. Thus both the DID and the RRG originate on the client side of a client-server computing environment.

Server 100 comprises, among other things, a database 122 that includes a plurality of chain entries of the format <DID, RRG>→<SIUI>→{RT-1, RT-2, RT-3, . . . , RT-n}. Each received identification tuple <DID, RRG> is mapped to a corresponding SIUI. As used herein, the abbreviation "SIUI" refers to a "server-issued unique identifier", which is a data string that is randomly generated by a server, and that is correlated with a particular identification tuple <DID, RRG> that was received by the server. In one embodiment, the SIUI comprises a 256-byte value that can be represented by a string of alphanumeric characters. Other value lengths can be used in other embodiments. In implementations where several different SIUI values are used, the nomenclature SIUI-x refers to an xth SIUL Likewise, each <DID, RRG>→<SIUI> mapping is further mapped to a set of one or more RT values, {RT-1, RT-2, RT-3, . . . , RT-n}. As used herein, the abbreviation "RT" refers to a "refresh token", which is a data string that is also randomly generated by the server, and that corresponds to a communication cycle between the server and a particular client device. Thus if the server and the particular client device have one communication cycle (for example, if the client device has contacted the server and the server has responded, or vice-versa), then the resulting set of RT values will have a single element {RT-1}. In one embodiment, the RT comprises a 256-byte value that can be represented by a string of alphanumeric characters. Other value lengths can be used in other embodiments. The nomenclature RT-x refers to an xth RT. A set of RT values {RT-1, RT-2, RT-3, . . . , RT-n} is referred to herein as an "RT set". Thus both the SIUI and the RT originate on the server side of a client-server computing environment.

Upon receiving the identification tuple <DID, RRG-1> from first client device 300a, server 100 generates a new SIUI-1 which corresponds to first client device 300a, and which is mapped to the incoming tuple <DID, RRG-1>. This mapping is stored in database 122. In addition, server 100 generates a new RT-1 and creates a new RT set {RT-1}. This new RT set is also stored in database 122, and is mapped to the existing <DID, RRG-1>→<SIUI-1> mapping, as described above. The result is a chain entry in database 122 that appears as <DID, RRG-1>→<SIUI-1>→{RT-1}. Server 100 responds to first client device 300a with a second communication ② that includes a response tuple <RRG-1, RT-1>. Upon receiving this response tuple, first client device 300a stores RT-1 locally.

When first client device 300a later transmits to server 100 a third communication ③, it will include the response tuple <DID, RRG-1, RT-1> with its outgoing transmission. Server 100 will attempt to match the incoming RT-1 with the most recent RT in the RT set that is associated with <DID, RRG-1> and <SIUI-1> in database 122. If a match exists, a next RT-2 is generated and added to form an updated RT set {RT-1, RT-2}. Server 100 responds to first client device 300a with a fourth communication ④ that includes an updated response tuple <RRG-1, RT-2>. As first client device 300a and server 100 continue to communicate with each other, the RT set that is associated with <DID, RRG-1> and <SIUI-1> in database 122 continues to grow, thus forming a chain that represents sequential client-server communication cycles between first client device 300a and server 100. These continued sequential communication cycles are referred to herein as Use Case 1, and can be understood as a baseline use scenario wherein no cloned or duplicate client devices are encountered.

Still referring to the example embodiment illustrated in FIG. 1, at some point after the first communication cycle between server 100 and first client device 300a is complete (that is, after second communication ② occurs), first client device 300a may be cloned to produce a second client device 300b. Possible cloning events are represented by the ● symbol in FIG. 1. This may be done by a malicious user seeking to exploit a device-based license provided by a software vendor or content provider. Or it may be done without nefarious intent, for example, by a technology administrator who copies an existing device configuration to a new device to quickly configure the new device. Regardless of the motivation for the cloning, certain of the embodiments disclosed herein are well-suited to detect such cloning. In particular, when first client device 300a is cloned, the resulting second client device 300b will inherit the response tuple <RRG-1, RT-1> that had previously been received from server 100. The cloning process can therefore be understood as propagating the previously received RT-1 from first client device 300a (the cloned device) to second client device 300b (the clone device). When second client device 300b begins communicating with server 100, this next communication ⑤ will include the response tuple <DID, RRG-1, RT-1> with its outgoing transmission. Server 100 will attempt to match the incoming RT-1 with the most recent RT in the RT set that is associated with <DID, RRG-1> and <SIUI-1> in database 122. If server 100 has already responded to first client device 300*a*, this most recent RT will be RT-2. The failure to match these RT values, referred to herein as a "Clash State", will indicate to server 100 that the received communication ⑤ was transmitted from a device that received an outdated RT from an unauthorized source, such as from a cloned client device. Detection of an unauthorized duplicate device identifier in this manner is referred to herein as Use Case 2, and can be understood as a cloned device use scenario. If server 100 has not already responded to first client device 300*a*, then the communication from second client device 300*b* will be taken as legitimate, and subsequent communications from first client device 300*a* will be taken as containing an unauthorized duplicate device identifier.

As noted above, in some cases multiple unrelated devices may have identical device identifiers. This may occur, for example, where a device manufacturer is not scrupulous in assigning identifiers to its devices, or where two device manufacturers unknowingly produce devices with identical identifiers. However, two unrelated devices with identical device identifiers will still generate distinct RRG values. Therefore, as illustrated in FIG. 1, a third client device 300*c* having an identical DID as first and second client devices 300*a*, 300*b* will initiate communication with server 100 by sending a first communication ① that includes an identification tuple <DID, RRG-2>. Because such a tuple does not exist in database 122, server 100 will treat third client device 300*c* as a new device, and thus will not trigger a Clash State. Server 100 will therefore respond to third client device 300*c* with a second communication ② that includes a response tuple <RRG-2, RT-1>, as described herein. First client device 300*a* and third client device 300*c* will therefore be unaffected by each other, even though they share an identical DID. This parallel operation is referred to herein as Use Case 3, and can be understood as a duplicate device identifier use scenario.

The example implementation illustrated in FIG. 1 and described above illustrates how certain of the embodiments disclosed herein address shortcomings of existing device identification frameworks. For example, a framework that supplements the client-provided DID with a server-generated SIUI is less susceptible to client-side manipulation of the DID, either due to an unstable hardware configuration, software defects, or a user with malicious intent. Likewise, building a server-side chain of refresh tokens that correspond to client-server communication cycles allows the server to independently verify that a particular communication is in sequence with other communications received from a particular client device, and thus allows cloned devices to be detected more reliably. Furthermore, a framework that supplements the DID with a RRG allows unrelated devices with identical identifiers to operate independently and without interfering with each other. This allows the server to differentiate between devices with duplicate identifiers that are related to each other (for example, by a cloning operation), and devices with duplicate identifiers that are unrelated to each other (for example, because the devices were initially manufactured with duplicate identifiers). Because the example device identification framework that is illustrated in FIG. 1 can be implemented without fundamentally altering existing client-server communication systems, and without substantially modifying existing client device architecture, it can be implemented across existing systems in a straightforward manner. This provides a degree of scalability that other solutions lack. These and other advantages will be apparent in light of this disclosure.

As used herein, the term "computing device" refers, in addition to its ordinary meaning, to an apparatus that has a processor, a memory, and input/output components that can be used to access or interact with the device. A computing device will also typically include one or more software modules configured to implement certain functionality, as well as hardware capable of enabling such implementation. Examples of computing devices include handheld computers, cellular telephones, tablet computers, smartphones, laptop computers, desktop computers, and set-top boxes. A "client computing device" refers to a computing device that is operating in a client-server computing environment, and that requests access to information or resources hosted by a server.

As used herein, the term "data structure" refers, in addition to its ordinary meaning, to a way of storing and organizing data in a computer accessible memory so that the data can be used by an application or software module. In its simplest from, a data structure can be, for example, a set of one or more memory locations. In some cases a data structure may be implemented as a so-called record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree, or hierarchical format having any suitable number of nodes; an object format that includes data fields; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a plurality of chain entries of the format <DID, RRG>→<SIUI>→{RT-1, RT-2, RT-3, . . . , RT-n}, wherein the RT set {RT-1, RT-2, RT-3, . . . , RT-n} represents communication cycles between a server and a device represented by the DID, RRG, and SIUI values.

System Architecture

FIG. 2 is a block diagram schematically illustrating selected components of an example device identification framework 10 that is resistant to device identification challenges presented by cloned devices and duplicate device identifiers. Framework 10 enables a server to, for example, differentiate between client devices with duplicate identifiers that are related to each other (for example, by a cloning operation), and devices with duplicate identifiers that are unrelated to each other (for example, because the devices were initially manufactured with duplicate identifiers). Framework 10 can be understood as comprising server 100 which is capable of communicating with one or more client devices 300 via a network 200. Network 200 can also be used to access optional supplementary resources such as cloud storage resources and network administration resources. In some cases such supplementary resources are omitted, with the corresponding functionality either provided by server 100 itself, or omitted altogether. Furthermore, while server 100 and client device 300 are illustrated in FIG. 2 as being directly connected to network 200, in other implementations they can be remotely coupled to network 200 by one or more other networks or communication channels.

In one embodiment server 100 comprises one or more enterprise class server devices that host, distribute, or administer digital resources that are made available to client device 300. In implementations that include multiple servers, the multiple servers are optionally managed by a load balancing system. Examples of resources that server 100 can make available to client device 300 include software, multimedia content, digital assets, and cloud-based storage resources. In some implementations, digital resources are provided to client device 300 on a trial basis, such as by providing free or discounted access to a resource for a limited time. In other implementations, unrestricted access to a resource is provided only to those clients holding a valid license. Server 100 can be configured to administer distribution of digital resources by establishing and enforcing the rules that govern how the resources are made available to clients. To this end, server 100 will often benefit from the ability to reliability identify and distinguish a particular client device 300 that requests access to hosted resources. Thus, in certain implementations, server 100 includes one or more software modules configured to implement the various functionalities associated with device identification framework 10, as well as hardware that enables such implementation. Examples of enabling hardware include a processor 110, a memory 120, a communication module 150, and a bus or interconnect 190. Examples of implementing software include an operating system 140, a token management module 160, a clash trigger module 170, and a user interface module 180.

While only one representative client device 300 is illustrated in FIG. 2 for clarity, it will be appreciated that, in general, framework 10 may include tens, hundreds, thousands, or indeed, any suitable number of client devices in communication with server 100. Thus references herein to a singular "client device" should be understood as encompassing embodiments comprising multiple client devices as well. Client device 300 may comprise, for example, one or more devices selected from a desktop computer, a laptop computer, a workstation, a tablet computer, a smartphone, a handheld computer, a set-top box, an enterprise class device, or any other such device capable of communicating with server 100. A combination of different devices may be used in certain embodiments. As illustrated in FIG. 2, client device 300 optionally includes a local secure cache 322 that can be used to store refresh tokens, response tuples, and other digital items received from, or cached for transmission to, server 100. In one embodiment local secure cache 322 is configured to restrict or prevent a user from accessing or manipulating the items stored therein.

Referring again to the example implementation of server 100 that is illustrated in FIG. 2, processor 110 comprises any suitable processor, and may include one or more coprocessors or controllers, such as a graphics processing unit, to assist in control and processing operations associated with server 100. Memory 120 is implemented using any suitable type of digital storage, such as one or more of a disk drive, a redundant array of independent disks (RAID), a universal serial bus (USB) drive, flash memory, random access memory (RAM), or any suitable combination of the foregoing. Thus in certain embodiments memory 120 comprises a distributed system of multiple digital storage devices, one or more of which may be remotely located and accessible via network 200. Memory 120 optionally hosts database 122, which can be used to store mappings between identification tuples, SIUI values, and RT sets, as will be described in turn. In some cases memory 120 also optionally is used to store a Clash Detected data structure 172 provided by clash trigger module 170.

Operating system 140 comprises any suitable operating system, such as GOOGLE® ANDROID™ (Google Inc., Mountain View, Calif.), MICROSOFT® WINDOWS® (Microsoft Crop., Redmond, Wash.), or APPLE® OS X° (Apple Inc., Cupertino, Calif.). As will be appreciated in light of this disclosure, the techniques provided herein can be implemented without regard to the particular operating system provided in conjunction with server 100, and therefore may also be implemented using any suitable existing or subsequently developed platform. Communication module 150 is any appropriate network chip or chipset which allows for wired or wireless connection to network 200 and other computing devices and resources. Communication module 150 can also be configured to provide intra-device communications via bus or interconnect 190.

Still referring to FIG. 2, token management module 160 comprises instructions encoded on a computer readable medium that, when executed using a processor, cause one or more of a variety of different token management processes to be invoked. Once such process involves managing acquisition of digital tokens such as SIUI values (acquired from a SIUI pool 162), RT values (acquired from a RT pool 164), and RRG values (generated based on a random algorithm). A token management process may also involve analyzing incoming tuples that are received from client device 300 and generating suitable response tuples. This may include extracting information from, or saving mappings to, server database 122. For example, in one implementation, as communications between client device 300 and server 100 occur, a token management process records a chain of tokens, one for each communication cycle, in database 122. Clients which may be duplicates of other client devices can be identified based on receipt of a token that is outdated with respect to that which is otherwise expected based on the progression of the recorded chain. These and other functionalities can be provided by token management module 160, as will be described in turn.

Clash trigger module 170 comprises instructions encoded on a computer readable medium that, when executed using a processor, cause one or more of a variety of different clash trigger processes to be invoked. Once such process involves compiling and maintaining Clash Detected data structure 172. As will be described in greater detail below, Clash Detected data structure 172 provides insight into the relationship between cloned client devices, thus allowing an analyst to identify a source device from which other clones originated. This can be accomplished by, for example, establishing a link between SIUI values for devices which are detected as being clones of each other. In certain embodiments a clash trigger process compiles and maintains metadata that defines Clash Detected data structure 172. In such embodiments the metadata can be saved in database 122. The functionalities provided by clash trigger module 170 will be described in turn.

User interface module 180 comprises instructions encoded on a computer readable medium that, when executed using a processor, cause a user interface to be generated. In one implementation, the user interface is configured to display information regarding the various client devices which have interacted with server 100, and in particular, regarding Clash States which server 100 has detected. Such information is optionally provided in the form of Clash Detected data structure 172. The user interface may also be configured to receive user input that defines how operational data is reported, or more generally, how device identification framework 10 operates. To this end, the user interface generated by user interface module 180 may include elements such as menu bars, toolbars, dialog boxes, control panels, dropdown menus, context menus, checkboxes, radio buttons, and the like.

The embodiments disclosed herein can be implemented in various forms of hardware, software, firmware, or special purpose processors. For example, in one embodiment a non-transitory computer readable medium has instructions encoded thereon that, when executed by one or more processors, implement one or more of the device identification frameworks disclosed herein. The instructions can be encoded using any suitable programming language, such as Scala, C, C++, object-oriented C, Swift, JavaScript, Java, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can be incorporated into a wide range of computing environments, such as web traffic analysis applications; licensed content distribution frameworks; and software distribution, activation, and update notification systems. For example, in one implementation device identification framework 10 is implemented in conjunction with a trial program that provides consumers with free access to a software application for a limited period. The client-server communications that occur during activation of the trial period are processed as disclosed herein, thus making it easier for an administrator to identify consumers who attempt to repeatedly enroll in the trial program. The device identification frameworks disclosed herein may include any number of different modules, sub-modules, or other components of distinct functionality, and can provide information to, or receive information from, still other components and services. These modules can be used, for example, to access cloud storage resources or network administration resources. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may comprise additional, fewer, or alternative subcomponents.

The aforementioned non-transitory computer readable medium may be any suitable medium for storing digital information, such as a hard drive, a server, a flash memory, RAM, or any combination of the foregoing. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology: Baseline (Use Case 1)

FIGS. 3A through 3D comprise a flowchart illustrating an example method 1000 for identifying a client device to a server device in a client-server computing environment. Method 1000 is also referred to herein as Use Case 1. As can be seen, method 1000 includes a number of phases and sub-processes, the sequence of which may vary from one embodiment to another. However, when considered in the aggregate, these phases and sub-processes form part of an improved device identification framework that is resistant to challenges presented by cloned devices and duplicate device identifiers. In one embodiment, this framework is responsive to detected communications in a client-server computing environment in accordance with certain of the techniques disclosed herein. Method 1000 can be implemented, for example, using the system architecture illustrated in FIG. 2 and described herein. However other system architectures can be used in other embodiments, as will be apparent in light of this disclosure. To this end, the correlation of the various functionalities shown in FIGS. 3A through 3D to the specific components illustrated in FIG. 2 is not intended to imply any structural or use limitations. Rather, other embodiments may include, for example, varying degrees of integration wherein multiple functionalities are effectively performed by one system or module. For example, in an alternative embodiment a single module is used to manage tokens and respond to detected Clash States. Thus other embodiments may have fewer or more modules depending on the granularity of implementation. Numerous variations and alternative configurations will be apparent in light of this disclosure.

Method 1000 is implemented in a client-server computing environment wherein (a) multiple client devices request access to information, resources, or information and resources hosted by a server, and (b) server seeks to distinguish communications from individual client devices. In this context, method 1000 commences with a particular client device 300 preparing to submit a request to server 100. To this end, client device 300 defines an "initial identification tuple" <DID, RRG>. See reference numeral 1110 in FIG. 3A. Here, DID indicates a device identifier associated with client device 300, such as may have been initially assigned by a manufacturer. The DID is intended to uniquely identify a particular client device to a server, although such identification may not always be stable or reliable. And RRG indicates a root random globally unique identifier that is randomly generated by client device 300 upon initial operation. In one embodiment, the RRG comprises a 256-byte value that can be represented by a string of alphanumeric characters. Other value lengths can be used in other embodiments. Client device 300 combines the DID and the RRG to form the initial identification tuple. Client device 300 then sends the initial identification tuple to server 100, for example with an initial server request. See reference numeral 1120 in FIG. 3A.

Upon receipt of the initial identification tuple by server 100, the token management process invoked by token management module 160 acquires a SIUI from SIUI pool 162. See reference numeral 1140 in FIG. 3A. Here, SIUI indicates a server-issued unique identifier that is randomly generated by server 100. Thus SIUI pool 162 can be understood as providing a repository of available SIUI values. In one embodiment, the token values in SIUI pool 162 are generated using a standard random number generator with an alphanumeric character space of 256. After the random numbers are generated, an optional check for duplicate values is conducted. Thus, in one embodiment, the SIUI comprises a 256-byte value that can be represented by a string of alphanumeric characters. Other value lengths can be used in other embodiments. The token management process invoked by token management module 160 also acquires a RT from RT pool 164. See reference numeral 1150 in FIG. 3A. Here, RT indicates a refresh token that is randomly generated by server 100. Thus RT pool 164 can be understood as providing a repository of available RT values. In one embodiment, the token values in RT pool 164 are generated using a standard random number generator with an alphanumeric character space of 256. After the random numbers are generated, an optional check for duplicate values is conducted. Thus, in one embodiment, the RT comprises a 256-byte value that can be represented by a string of alphanumeric characters. Other value lengths can be used in other embodiments.

The token management process invoked by token management module 160 maps the initial identification tuple received from client device 300 to the acquired SIUI, thus forming a mapping <DID, RRG>→<SIUI> that is saved in server database 122. See reference numeral 1160 in FIG. 3A. A chain entry <DID, RRG>→<SIUI>→{RT} is also saved in server database 122. See reference numeral 1170 in FIG. 3A. Here, {RT} indicates a set of RT values. At the outset {RT} comprises only the RT value that was initially acquired from RT pool 164. As additional communications between other clients and server 100 are processed, database 122 will grow to contain a large number of such chain entries for the various clients, as identified by their DID, RRG, and SIUI values. The token management process invoked by token management module 160 defines a "response tuple" <RRG, RT>. See reference numeral 1210 in FIG. 3B. Communication module 150 is configured to append this response tuple to the response that is sent from server 100 to client device 300. See reference numeral 1220 in FIG. 3B.

Client device 300 stores the received response tuple <RRG, RT> in local secure cache 322. See reference numeral 1230 in FIG. 3B. When preparing to communicate again with server 100, client device 300 appends its DID to the saved response tuple to form a modified response tuple <DID, RRG, RT>. See reference numeral 1240 in FIG. 3B. Client device 300 may respond to server well after the response tuple was initially received from server 100, particularly in implementations where significant client-side processing or user interaction occurs. In some cases client device 300 may generate different DID values at different times, for example due to a defect in the DID computation logic. A determination is therefore made with respect to whether the DID values generated by the client device 300 are stable, and in particular, whether a previously-generated DID matches a subsequently-generated DID. See reference numeral 1250 in FIG. 3B. This can be accomplished by comparing the two DID values. If client device 300 generates unstable DID values, the subsequent communications with server 100 are configured and processed differently, as will be discussed in turn with respect to Use Case 4. On the other hand, if the subsequently-generated DID that is used to form the modified response tuple matches the DID present in the initial identification tuple, then the modified response tuple <DID, RRG, RT> is sent to server 100 with a subsequent server request. See reference numeral 1260 in FIG. 3B.

Upon receiving the modified response tuple, the token management process invoked by token management module 160 extracts the DID and RRG values. See reference numeral 1410 in FIG. 3C. Using these extracted values, database 122 is searched to identify and retrieve the associated SIUI and RT set. See reference numeral 1420 in FIG. 3C. The RT set is analyzed and the most-recently-added RT value is identified. This value is referred to herein as RT-server because it is stored at server 100. See reference numeral 1430 in FIG. 3C. Likewise, the RT value received from client device 300 as part of the modified response tuple is referred to herein as RT-client. See reference numeral 1440 in FIG. 3C. A determination is made with respect to whether RT-server and RT-client are identical. See reference numeral 1450 in FIG. 3C. If not, this indicates that other communications have occurred between server 100 and another client holding an identical DID and RRG, as will be discussed in turn with respect to Use Case 2.

On the other hand, if RT-server and RT-client are identical, the token management process invoked by token management module 160 acquires the next available RT from RT pool 164. See reference numeral 1460 in FIG. 3C. The RT set stored in database 122 is updated to include this newly acquired RT as the newest RT contained in the RT set. See reference numeral 1510 in FIG. 3D. Thus the RT set can be understood as revealing a series of RT values, each of which represent a communication cycle between server 100 and client device 300. The RT set therefore can be understood as providing a record of communications that have occurred between server 100 and a particular client, as identified by the mapped DID, RRG, and SIUI values. When nonsequential communications are detected, this may be indicative of a device which is a clone of another device which has previously communicated with server 100.

The token management process invoked by token management module 160 updates the response tuple to replace the existing RT-client with the newer RT acquired from RT pool 164. See reference numeral 1520 in FIG. 3D. Communication module 150 can be configured to determine whether further client-server communication is to occur. See reference numeral 1530 in FIG. 3D. If so, the response tuple is returned to client device 300, as described herein. Client device 300 processes the response tuple in similar fashion as the previously-received response tuple was processed. This process of exchanging an updated RT between client and server, and maintaining the series of exchanged RT values in database 122, can continue indefinitely. Once no further client-server communications are to occur, method 1000 ends. Method 1000 can be understood as a baseline use scenario since it accommodates a situation where duplicate devices are not encountered, and the sequence of RT values that server 100 receives from client device 300 are not subject to unexpected interruptions or duplications.

It is possible that, in some cases, one or both of SIUI pool 162 and RT pool 164 will become empty. If this happens, token management module 160 can be configured to initiate a cleanup operation in which the RT sets stored in database 122 are shortened to the null set, and all incoming client communications are treated as an initial client contact providing an initial identification tuple. This will involve ignoring the most recently issued RT and previous RRG and SIUI mappings. While it is possible that a Clash State will occur without detection during this first communication cycle after the cleanup operation, any duplicate devices will likely be detected on a subsequent communication cycle.

Methodology: Cloned Device (Use Case 2)

As noted above, the RT set maintained in database 122 comprises a sequence of RT values that correspond to the outgoing response tuples sent from server 100 to client device 300. Thus, under normal operations, for example, where no duplicate devices are encountered, the RT values contained in the response tuples received from client device 300 will match the values stored in database 122. When mismatch occurs between these values, this indicates that other communications have already occurred between server 100 and another client holding a duplicate DID and RRG. In particular, this indicates that a particular client device may have been cloned, for example through a virtualization process. Cloning, virtualizing, or otherwise duplicating client device 300 can create a scenario wherein two client devices having identical DID and RRG values attempt to establish separate communication cycles with server 100. This is because the cloning operation will cause the clone to hold the same <DID, RRG, RT> tuple as the cloned device. As device cloning and virtualization techniques have been refined and improved, it has become easier to reliably duplicate the DID and RRG values held by a cloned device.

FIGS. 4A and 4B comprise a flowchart illustrating an example method 2000 for distinguishing cloned devices in a device identification framework. Method 2000 is also referred to herein as Use Case 2. As can be seen, method 2000 includes a number of phases and sub-processes, the sequence of which may vary from one embodiment to another. However, when considered in the aggregate, these phases and sub-processes form part of an improved device identification framework that is resistant to challenges presented by cloned devices and duplicate device identifiers. In one embodiment, this framework is responsive to detected communications in a client-server computing environment in accordance with certain of the techniques disclosed herein. Method 2000 can be implemented, for example, using the system architecture illustrated in FIG. 2 and described herein. However other system architectures can be used in other embodiments, as will be apparent in light of this disclosure. To this end, the correlation of the various functionalities shown in FIGS. 4A and 4B to the specific components illustrated in FIG. 2 is not intended to imply any structural or use limitations. Rather, other embodiments may include, for example, varying degrees of integration wherein multiple functionalities are effectively performed by one system or module. Thus other embodiments may have fewer or more modules depending on the granularity of implementation. Numerous variations and alternative configurations will be apparent in light of this disclosure.

Method 2000 is invoked in response to determining that a RT received from client device 300 (RT-client) does not match the most recent RT held by server 100 (RT-server) in the RT set stored in database 122. See reference numeral 1450 in FIG. 3C. This will occur after at least one client-server communication cycle is complete, as described above in Use Case 1. Once a mismatch occurs between RT-client and RT-server, method 2000 is invoked, and the token management process invoked by token management module 160 generates a new RRG, referred to herein as RRG-new, to be associated with the device that sent the nonsequential RT. See reference numeral 2110 in FIG. 4A. As with the initially-generated RRG, in one embodiment, RRG-new comprises a 256-byte value that can be represented by a string of alphanumeric characters. Other value lengths can be used in other embodiments. The next available SIUI, referred to herein as SIUI-next, is acquired from SIUI pool 162. See reference numeral 2120 in FIG. 4A. Likewise, the next available RT, referred to herein as RT-next, is acquired from RT pool 164. See reference numeral 2140 in FIG. 4A. Obtaining new RRG, SIUI, and RT values allows server 100 to uniquely identify the duplicate client device.

Using RRG-new, a new "clone identification tuple" <DID, RRG-new> is defined. See reference numeral 2150 in FIG. 4A. The token management process invoked by token management module 160 maps the clone identification tuple to the acquired SIUI-next, thus forming a mapping <DID, RRG-new>→<SIUI-next> that is saved in server database 122. See reference numeral 2160 in FIG. 4A. A corresponding chain entry <DID, RRG-new>→<SIUI-next>→{RT-next} is also saved in server database 122. See reference numeral 2170 in FIG. 4A. The token management process invoked by token management module 160 defines a response tuple <RRG-new, RT-next>. See reference numeral 2210 in FIG. 4B.

When a RT received from client device 300 does not match the most recent RT held by server 100 in the RT set stored in database 122, this indicates that other communications have occurred between server 100 and another client holding a duplicate DID and RRG. This is a referred to as a Clash State. It is useful to make a record of the Clash State, and in particular, to record which devices sent conflicting RT values. Where one device is the source for many cloned devices, as is often the case, linking the devices the provide conflicting RT values allows entire suites of virtualized devices to be identified. Thus in certain embodiments a clash trigger process invoked by clash trigger module 170 is further configured to create an entry {SIUI-old→SIUI-next} in Clash Detected data structure 172. See reference numeral 2220 in FIG. 4B. Here, SIUI-old refers to the duplicate SIUI received from the duplicate client device, while SIUI-next refers to the replacement SIUI generated in the course of method 2000.

In certain embodiments, Clash Detected data structure can be rendered graphically, as illustrated in FIG. 4B. In this example representation, an originating client device identified by SIUI-0 was virtualized to form a first duplicate client device identified by SIUI-1, which was in turn virtualized to form a second duplicate client device identified by SIUI-2, and so forth. In some cases, a particular client device may be cloned multiple times, such as in the case of the client device identified by SIUI-5. A graphical representation of Clash Detected data structure 172 allows the source of the duplicate devices (SIUI-0 in the illustrated example) to be quickly identified. Likewise, all devices linked to the originating client device can be readily identified as well. This functionality may be particularly useful where a security breach is detected on a duplicate device, since it will often be desired to identify the source of the duplicate device as well. The clash trigger process invoked by clash trigger module 170 is also optionally configured to take any other suitable action in response to detecting a Clash State, such as by sending notifications or restricting access to server resources. Such actions can be taken with respect to the conflicting devices, or to all devices linked thereto via Clash Detected data structure 172.

Method 2000 illustrated in FIGS. 4A and 4B effectively defines new RRG, SIUI, and RT values for the device that is detected as providing an unexpected RT. This special treatment provides a new path for the duplicate device, thus avoiding conflicts with existing client devices, thus facilitating server communication with both devices. Even though a large number of duplicate devices may exist, method 2000 can be applied for each such device, with each duplicate device receiving its own new RRG and SIUI values, and thus its own new path. Once the new and unique response tuple <RRG-new, RT-next> is defined for a particular device, it can be returned to client device 300, where it is processed as described above in conjunction with Use Case 1. This continues the iterative process of exchanging an updated RT between client and server, and maintaining the series of exchanged RT values in database 122, linked to a unique <DID, RRG-new>→<SIUI-next> mapping.

Methodology: Duplicate Device Identifier (Use Case 3)

As noted above, there are many instances where multiple unrelated client devices may have identical device identifiers. This may occur, for example, where a device manufacturer is not scrupulous in assigning identifiers to its devices, or where two device manufacturers unknowingly produce devices with identical identifiers. However, two unrelated client devices with identical device identifiers will still generate distinct RRG values. Therefore, when two such devices initially establish contact with a server pursuant to the device identification framework disclosed herein, a first one of the devices will generate a response tuple <DID, RRG-1, RT>, and a second one of the devices will generate a response tuple <DID, RRG-2, RT>. These devices will work independently and will not generate a Clash State since the server does not receive identical RRG values from the two devices.

Methodology: Unstable Device Identifier (Use Case 4)

As noted above, in many instances a client device cannot be trusted to reliably identify itself with the same device identifier each time the client contacts a server. This may be because the client has an unstable hardware configuration or a defect in the device identifier computation logic. It could be that the client communication protocols have been manipulated in an effort to bypass a software or content license that is limited to a single device. Regardless of the cause, if a single client device 300 generates multiple DID values, method 1000 can be modified to accommodate such a behavior. Such accommodation is referred to herein as Use Case 4, and can be understood as an unstable device identifier scenario.

FIGS. 5A and 5B comprise a flowchart illustrating an example method 4000 for identifying a client device to a server device in a client-server computing environment, wherein the client device generates multiple unique device identifier values. Method 4000 is also referred to herein as Use Case 4. As can be seen, method 4000 includes a number of phases and sub-processes, the sequence of which may vary from one embodiment to another. However, when considered in the aggregate, these phases and sub-processes form part of an improved device identification framework that is resistant to challenges presented by devices that cannot be trusted to reliably identify themselves with the same device identifier. In one embodiment, this framework is responsive to detected communications in a client-server computing environment in accordance with certain of the techniques disclosed herein. Method 4000 can be implemented, for example, using the system architecture illustrated in FIG. 2 and described herein. However, other system architectures can be used in other embodiments, as will be apparent in light of this disclosure. To this end, the correlation of the various functionalities shown in FIGS. 5A and 5B to the specific components illustrated in FIG. 2 is not intended to imply any structural or use limitations. Rather, other embodiments may include, for example, varying degrees of integration wherein multiple functionalities are effectively performed by one system or module. Thus other embodiments may have fewer or more modules depending on the granularity of implementation. Numerous variations and alternative configurations will be apparent in light of this disclosure.

Method 4000 is invoked in response to determining that client device 300 is generating DID values which are unstable, and in particular, in response to determining that a previously-generated DID does not match a subsequently-generated DID. See reference numeral 1250 in FIG. 3B. This will occur after at least one client-server communication cycle in complete, as described above in Use Case 1. Once unstable DID generation is observed, method 4000 is invoked and client device 300 defines a modified response tuple that includes both a previously-generated DID (referred to herein as DID-old) and a subsequently-generated DID (referred to herein as DID-new). See reference numeral 4110 in FIG. 5A. One example of such a modified response tuple is <DID-new, RRG, RT, DID-old>. In certain embodiments this data is extracted from local storage cache 322. Client device 300 sends this modified response tuple to server with a subsequent server request. See reference numeral 4120 in FIG. 5A. This effectively provides server 100 with a list of DID values that client device 300 has created over a period of time. In certain embodiments, upon receiving the modified response token, the token management process invoked by token management module 160 derives a new pseudo-server-side device identifier (PDID) by performing a bitwise OR operation on DID-old and DID-new. See reference numeral 4140 in FIG. 5A. In an alternative embodiment a different operation is used to combine DID-old and DID-new, such as a concatenation operation or a bitwise AND operation.

The RRG is extracted from the modified response tuple received from client device 100. See reference numeral 4150 in FIG. 5A. Using the derived PDID value and the extracted RRG value, database 122 is searched to identify and retrieve the associated SIUI and RT set. See reference numeral 4160 in FIG. 5A. The RT set is analyzed and the most-recently-added RT value is identified. This value is referred to herein as RT-server because it is stored at server 100. See reference numeral 4170 in FIG. 5A. Likewise, the RT value received from client device 300 as part of the modified response tuple is referred to herein as RT-client. See reference numeral 4210 in FIG. 5B. A determination is made with respect to whether RT-server and RT-client are identical. See reference numeral 4220 in FIG. 5B. If not, this indicates that other communications have occurred between server 100 and another client generating the same DID values DID-old and DID-new. This may occur where the same defective logic was duplicated in a device virtualization operation. In this case, Use Case 2 is invoked using the PDID instead of a standard DID.

On the other hand, if RT-server and RT-client are identical, the token management process invoked by token management module 160 acquires the next available SIUI, referred to herein as SIUI-next, from SIUI pool 162. See reference numeral 4230 in FIG. 5B. Likewise, the next available RT, referred to herein as RT-next, is acquired from RT pool 164. See reference numeral 4240 in FIG. 5B. A modified client identification tuple <PDID, RRG> is mapped to the acquired SIUI-next, thus forming a mapping <PDID, RRG>→<SIUI-next> that is saved in server database 122. A corresponding chain entry <PDID, RRG>→<SIUI-next>→{RT-next} is also saved in server database 122. See reference numeral 4250 in FIG. 5B. The token management process invoked by token management module 160 also defines an updated response tuple <RRG, RT-next>. See reference numeral 4260 in FIG. 5B. This updated response tuple can be returned to client device 300, where it is processed as described above in conjunction with Use Case 1. This continues the iterative process of exchanging an updated RT between client and server, and maintaining the series of exchanged RT values in database 122, linked to a unique <PDID, RRG>→<SIUI-next> mapping.

While method 4000 is described in the context of a client device producing two different DID values DID-old and DID-new, it can also be used in applications where the client device (a) repeatedly alternates between providing DID-old and DID-new, or (b) continues to provide new DID values in each communication cycle. The modified response tuple provided by the client device will provide a sequential history of previously generated DID values. And the bitwise OR operation, as performed on all received DID values will continue to generate a unique PDID value that can be used to identify the particular client device and retrieve the associated SIUI and RT set. The method is not adversely affected by the loss of SIUI values since the PDID values can be used to uniquely identify the client device.

If a client device that generates multiple DID values is cloned, and the resulting duplicate devices generate the same sequence of multiple DID values, then this suggests that the DID computation logic defect was propagated from the original device to its clones. In this case, the methodology associated with Use Case 2 can be invoked to address situations where a RT mismatch is detected. See reference numeral 4220 in FIG. 5B. On the other hand, if a client device that generates multiple DID values is cloned, and the resulting duplicate devices create different device identifiers, the methodology associated with Use Case 3 can be invoked.

Further Example Embodiments

Numerous variations and configurations will be apparent in light of this disclosure. For instance, as illustrated in FIG. 6, one example embodiment provides a computer-implemented method 6000 for identifying client devices in a client-server computing environment. Method 6000 includes receiving, by a server from a client device, a DID that has been assigned to the client device. See reference numeral 6100 in FIG. 6. See also reference numerals 1110 and 1120 in FIG. 3A, which indicate that method 1000 for identifying a client device to a server device includes sending an initial identification tuple <DID, RRG> to a server with an initial server request.

Method 6000 further includes acquiring, by the server, a first RT. See reference numeral 6200 in FIG. 6. See also reference numeral 1150 in FIG. 3A, which indicates that method 1000 for identifying a client device to a server device includes acquiring a RT from a RT pool.

Method 6000 further includes sending, from the server to the client device, the first RT. See reference numeral 6300 in FIG. 6. See also reference numerals 1210 and 1220 in FIG. 3B, which indicate that method 1000 for identifying a client device to a server device includes appending a response tuple <RRG, RT> to a response that is sent from a server to a client device.

Method 6000 further includes receiving, by the server from an unidentified device, the DID and a second RT. See reference numeral 6400 in FIG. 6. See also reference numerals 1240 and 1260 in FIG. 3B, which indicate that method 1000 for identifying a client device to a server device includes sending a modified response tuple to the server with a subsequent server request, wherein the modified response tuple is formed by appending a client DID to a response tuple previously sent from the server to the client device.

Method 6000 further includes making a determination that the first and second RT values are identical. See reference numeral 6500 in FIG. 6. See also reference numeral 1450 in FIG. 3C, which indicates that method 1000 for identifying a client device to a server device includes determining whether RT-server and RT-client are equal. Here, RT-server is defined as the newest RT in a RT set retrieved from a server database, and RT-client is defined as a RT received from the client in a modified response tuple. See reference numerals 1430 and 1440 in FIG. 3C.

Method 6000 further includes identifying the unknown device as the client device based on the determination. See reference number 6600 in FIG. 6. See also reference numerals 1460 in FIG. 3C and reference numerals 1510 and 1520 in FIG. 3D, which indicate that an updated response tuple is generated without new device identification token values such as new RRG or SIUI values.

In some cases the method further includes receiving, by the server from the client device in an initial identification tuple that includes the DID, a RRG that has been generated by the client device. In some cases (a) the method further includes receiving, by the server from the client device in an initial identification tuple that includes the DID, a RRG that has been generated by the client device; and (b) the RRG is sent from the server to the client device in a response tuple that includes the first RT. In some cases the DID and the second RT are received in a modified response tuple that was generated by the unknown device. In some cases (a) the method further includes receiving, by the server from the client device in an initial identification tuple that includes the DID, a RRG that has been generated by the client device; and (b) the DID and the RRG are also received from the unidentified device. In some cases the server includes a RT pool from which the first RT is acquired. In some cases the method further includes (a) generating, by the server, a SIUI corresponding to the client device; and (b) forming an association between the SIUI, the received DID, and the first RT, wherein the association is formed in a database administered by the server. In some cases the method further includes (a) receiving, by the server from the client device in an initial identification tuple that includes the DID, a RRG that has been generated by the client device; and (b) mapping the initial identification tuple to the first RT in a database that is administered by the server; wherein (c) making the determination further comprises using the DID to extract the first RT from the database.

Another example embodiment provides a device identification system. The system includes a memory device. The system further includes a processor that is operatively coupled to the memory device. The processor is configured to execute instructions stored in the memory device that, when executed, cause the processor to carry out a process for identifying client devices in a client-server computing environment. The process includes receiving, by a server from a client device, a RRG that has been generated by the client device and a first RT. The process further includes using the received RRG to lookup a second RT in a database administered by the server. The process further includes making a determination that the first RT is outdated with respect to the second RT. The process further includes assigning a new RRG (RRG-new) to the client device. The process further includes acquiring a new RT. The process further includes associating RRG-new with the new RT in the database. The process further includes sending a tuple comprising RRG-new and the new RT to the client device. In some cases (a) the RRG and the first RT are received in a response tuple that includes a plurality of different DID values; (b) the process further includes generating a pseudo-server-side device identifier (PDID) by performing a bitwise OR operation on the plurality of different DID values; and (c) associating RRG-new with the new RT in the database further comprises mapping a tuple <PDID, RRG-new> to a RT set that includes the new RT. In some cases acquiring the new RT comprises acquiring the new RT from a RT pool hosted by the server. In some cases (a) the RRG and the first RT are received in a response tuple that includes a DID; (b) the database includes a mapping of the response tuple to SIUI-1, which that is associated with the client device; (c) the process further includes acquiring a new SIUI-2 and associating the new SIUI-2 with the client device; and (d) the process further includes creating a new entry {SIUI-1→SIUI-2} in a Clash Detected data structure. In some cases (a) the RRG and the first RT are received in a response tuple that includes a DID; (b) the database includes a mapping of the response tuple to a SIUI associated with the client device; (c) the process further includes defining a clone identification tuple <DID, RRG-new>; (d) the process further includes acquiring a new SIUI; and (e) the process further includes creating a chain entry in the database that comprises an updated mapping of the clone identification tuple to the new SIUI, which is in turn mapped to a RT set that includes the new RT. In some cases (a) the RRG and the first RT are received in a response tuple that includes a DID; and (b) the process further includes defining a clone identification tuple that includes the DID and the new RRG. In some cases (a) the RRG and the first RT are received in a response tuple that includes a DID; and (b) both the RRG and the DID are used to lookup the second RT. In some cases (a) the RRG and the first RT are received in a response tuple that includes a DID; (b) the RRG is generated by the client device; and (c) the DID is assigned by a manufacturer of the client device.

Another example embodiment provides a non-transitory computer readable medium having instructions encoded thereon that, when executed by one or more processors, cause a process for identifying client devices in a client-server computing environment to be carried out. The process includes receiving, by a server from a client device, a DID that has been assigned to the client device and a RRG that has been generated by the client device. The process further includes acquiring, by the server, a SIUI corresponding to the client device. The process further comprises acquiring, by the server, a first refresh token (RT-1). The process further comprises creating a chain entry in a database administered by the server, wherein the chain entry comprises <DID, RRG>→<SIUI>→{RT-1}, wherein {RT-1} is a set comprising RT-1. The process further includes sending a response tuple <RRG, RT-1> to the client device. The process further includes receiving a modified response tuple <DID, RRG, RT-1> from the client device. The process further includes, in response to receiving the modified response tuple, acquiring a second refresh token RT-2. The process further includes adding the second refresh token RT-2 to the set comprising the first RT. The process further includes sending an updated response tuple <RRG, RT-2> to the client device. In some cases the SIUI is acquired from a SIUI pool hosted by the server. In some cases a quantity of RT in the set corresponds to a quantity of communication cycles that have occurred between the server and the client device. In some cases (a) the first and second RT values are acquired from a RT pool; and (b) the process further includes, in response to determining that the RT pool is exhausted, emptying the set and resetting the RT pool.

The foregoing description has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

What is claimed is:

1. A computer-implemented method for identifying client devices in a client-server computing environment, the method comprising:

receiving, by a server from a client device, a device identifier that has been assigned to the client device;

acquiring, by the server, a first refresh token;

sending, from the server to the client device, the first refresh token;

receiving, by the server from an unidentified device, the device identifier and a second refresh token;

making a determination that the first and second refresh tokens are identical; and identifying the unidentified device as the client device based on the determination.

2. The method of claim 1, wherein:

the server receives, from the client device, an initial identification tuple that includes a plurality of different device identifiers; and the method further comprises generating, by the server, a pseudo-server-side device identifier by performing a bitwise OR operation on the plurality of different device identifiers.

3. The method of claim 1, wherein the device identifier is assigned by a manufacturer of the client device.

4. The method of claim 1, wherein the server acquires the first refresh token in response to receiving the device identifier from the client device.

5. The method of claim 1, further comprising receiving, by the server from the client device in an initial identification tuple that includes the device identifier, a root random globally unique identifier (RRG) that has been generated by the client device.

6. The method of claim 1, wherein:

the method further comprises receiving, by the server from the client device in an initial identification tuple that includes the device identifier, a root random globally unique identifier (RRG) that has been generated by the client device; and the RRG is sent from the server to the client device in a response tuple that includes the first refresh token.

7. The method of claim 1, wherein the device identifier and the second refresh token are received in a modified response tuple that was generated by the unidentified device.

8. The method of claim 1, wherein:

the method further comprises receiving, by the server from the client device in an initial identification tuple that includes the device identifier, a root random globally unique identifier (RRG) that has been generated by the client device; and the device identifier and the RRG are also received from the unidentified device.

9. The method of claim 1, wherein the server includes a refresh token pool from which the first refresh token is acquired.

10. The method of claim 1, further comprising:

generating, by the server, a server issued unique identifier (SIUI) corresponding to the client device; and forming an association between the SIUI, the received device identifier, and the first refresh token, wherein the association is formed in a database administered by the server.

11. The method of claim 1, further comprising:

receiving, by the server from the client device in an initial identification tuple that includes the device identifier, a root random globally unique identifier (RRG) that has been generated by the client device;

in response to the server receiving the initial identification tuple, acquiring, by the server, a server issued unique identifier (SIUI) that is associated with the client device; and creating a chain entry in a database, the chain entry comprising a mapping of the initial identification tuple to the SIUI, which in turn is mapped to a refresh token set that includes the first refresh token.

12. The method of claim 1, further comprising:
receiving, by the server from the client device in an initial identification tuple that includes the device identifier, a root random globally unique identifier (RRG) that has been generated by the client device; and
mapping the initial identification tuple to the first refresh token in a database that is administered by the server;
wherein making the determination further comprises using the device identifier to extract the first refresh token from the database.

13. A non-transitory computer readable medium having instructions encoded thereon that, when executed by one or more processors, cause a process for identifying client devices in a client-server computing environment to be carried out, the process comprising:
receiving, by a server from a client device, a device identifier that has been assigned to the client device;
acquiring, by the server, a first refresh token;
sending, from the server to the client device, the first refresh token;
receiving, by the server from an unidentified device, the device identifier and a second refresh token;
making a determination that the first and second refresh tokens are identical; and
identifying the unidentified device as the client device based on the determination.

14. The non-transitory computer readable medium of claim 13, wherein:
the server receives, from the client device, an initial identification tuple that includes a plurality of different device identifiers; and
the method further comprises generating, by the server, a pseudo-server-side device identifier by performing a bitwise OR operation on the plurality of different device identifiers.

15. The non-transitory computer readable medium of claim 13, wherein the device identifier is assigned by a manufacturer of the client device.

16. The non-transitory computer readable medium of claim 13, wherein the server acquires the first refresh token in response to receiving the device identifier from the client device.

17. A device identification system that comprises a memory device and a processor that is operatively coupled to the memory device, wherein the processor is configured to execute instructions stored in the memory device that, when executed, cause the processor to carry out a process for identifying client devices in a client-server computing environment, the process comprising:
receiving, by a server from a client device, a device identifier that has been assigned to the client device;
acquiring, by the server, a first refresh token;
sending, from the server to the client device, the first refresh token;
receiving, by the server from an unidentified device, the device identifier and a second refresh token;
making a determination that the first and second refresh tokens are identical; and
identifying the unidentified device as the client device based on the determination.

18. The non-transitory computer readable medium of claim 17, wherein the process further comprises receiving, by the server from the client device in an initial identification tuple that includes the device identifier, a root random globally unique identifier (RRG) that has been generated by the client device.

19. The non-transitory computer readable medium of claim 17, wherein:
the method further comprises receiving, by the server from the client device in an initial identification tuple that includes the device identifier, a root random globally unique identifier (RRG) that has been generated by the client device; and
the RRG is sent from the server to the client device in a response tuple that includes the first refresh token.

20. The non-transitory computer readable medium of claim 17, wherein the device identifier and the second refresh token are received in a modified response tuple that was generated by the unidentified device.

* * * * *